United States Patent
Bendahan et al.

(10) Patent No.: US 11,496,215 B2
(45) Date of Patent: Nov. 8, 2022

(54) VLC IN FACTORIES

(71) Applicant: AISIN CORPORATION, Kariya (JP)

(72) Inventors: Remy Bendahan, Sophia Antispolis (FR); Sylvain Bougnoux, Sophia Antispolis (FR); Yuta Nakano, Sophia Antispolis (FR); Takeshi Fujita, Kariya (JP)

(73) Assignee: AISIN CORPORATION, Kariya (JP)

( * ) Notice: Subject to any disclaimer, the term of this patent is extended or adjusted under 35 U.S.C. 154(b) by 0 days.

(21) Appl. No.: 17/189,950

(22) Filed: Mar. 2, 2021

(65) Prior Publication Data
US 2021/0399802 A1 Dec. 23, 2021

(30) Foreign Application Priority Data

Jun. 23, 2020 (EP) .................................... 20315313

(51) Int. Cl.
*H04B 10/116* (2013.01)
*G08B 21/18* (2006.01)

(52) U.S. Cl.
CPC ........... *H04B 10/116* (2013.01); *G08B 21/18* (2013.01)

(58) Field of Classification Search
CPC .............................. H04B 10/116; G08B 21/18
USPC ........................................................ 398/118
See application file for complete search history.

(56) References Cited

U.S. PATENT DOCUMENTS

| 9,635,888 | B2* | 5/2017 | Ishihara | ............... A44C 5/0015 |
| 2011/0227748 | A1* | 9/2011 | Schaible | ................ G08B 21/18 340/686.6 |
| 2012/0184367 | A1* | 7/2012 | Parrott | .................... G06F 1/163 463/31 |
| 2012/0230703 | A1 | 9/2012 | Yamada et al. | |
| 2012/0305770 | A1* | 12/2012 | Minera | .................. A41D 1/002 250/206 |
| 2015/0280818 | A1 | 10/2015 | Walma et al. | |
| 2017/0140576 | A1 | 5/2017 | Lim et al. | |
| 2017/0205785 | A1* | 7/2017 | Almadani | ............. G05B 15/02 |
| 2018/0064353 | A1* | 3/2018 | Su | .......................... A61B 5/339 |
| 2019/0046114 | A1 | 2/2019 | Bogdanovich et al. | |
| 2019/0386746 | A1 | 12/2019 | Olsen et al. | |
| 2020/0044886 | A1 | 2/2020 | Jessen et al. | |

FOREIGN PATENT DOCUMENTS

WO 2019/005051 A1 1/2019

OTHER PUBLICATIONS

European Search Report of EP 20 31 5313 dated Nov. 23, 2020.

* cited by examiner

*Primary Examiner* — Dalzid E Singh
(74) *Attorney, Agent, or Firm* — Sughrue Mion, PLLC

(57) ABSTRACT

Clothing equipment having a visual light communication emitter arranged to communicate a status of the clothing equipment, includes a light emitter arranged to emit flash light which is modulated at at least one target frequency in a dedicated non-visible spectrum, the light emitter including three fixed emitting portions distant from each other by predetermined distances, so as to authenticate the status of the clothing equipment.

14 Claims, 4 Drawing Sheets

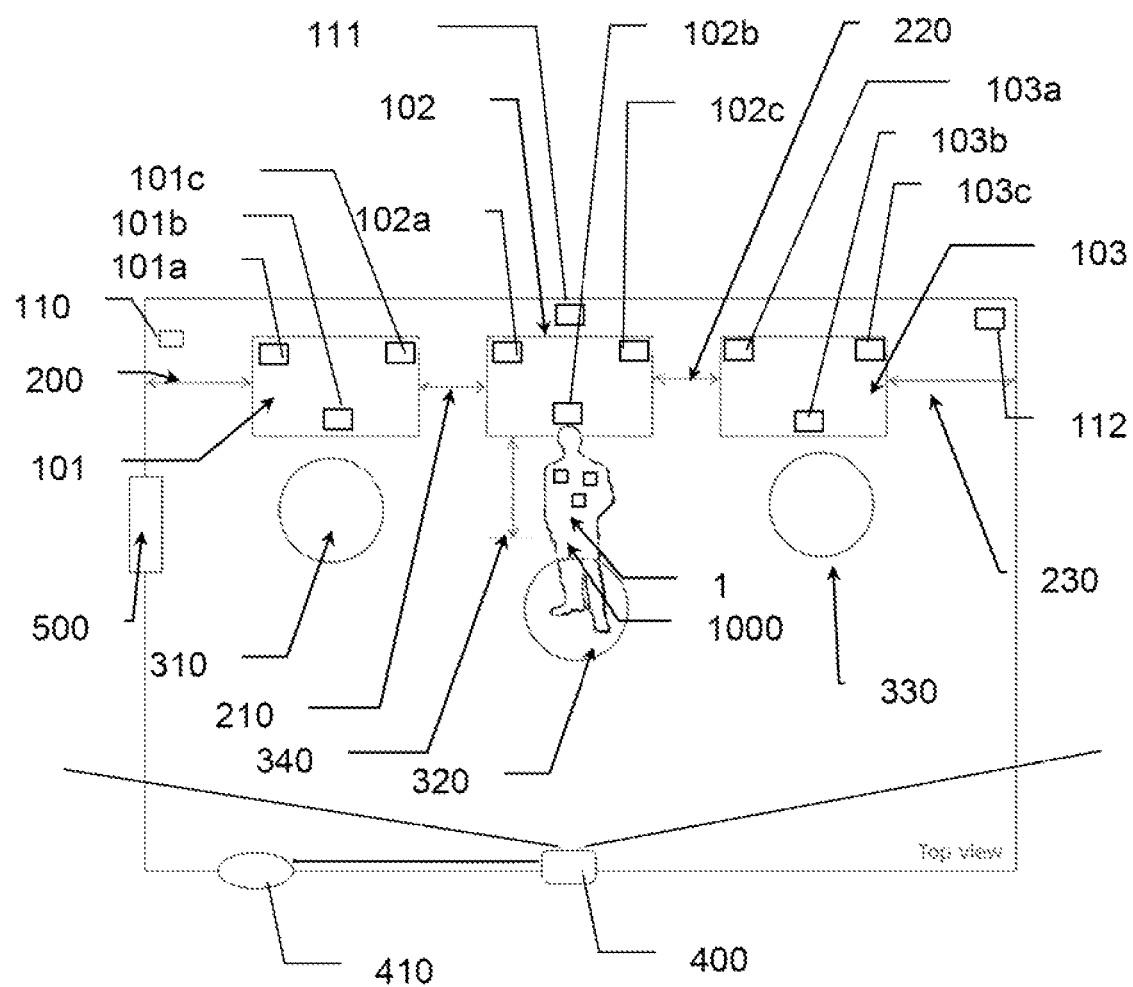

VLC IN FACTORIES

CROSS REFERENCE TO RELATED APPLICATIONS

This application is based on and claims priority under 35 U.S.C. § 119 to European Patent Application 20315313.5, filed on Jun. 23, 2020, the entire content of which is incorporated herein by reference.

TECHNICAL FIELD

This disclosure generally relates to clothing equipment, in particular for visual light communication between a clothing equipment and a detection device, such as detection of workers in a factory.

BACKGROUND DISCUSSION

Visual light communication (VLC) devices have been of great interest since few years. Visual Light communication is considered as an alternative to radio frequency (RF) communication.

Visual Light communication can occur between fixed or moving emitters and receivers. Typical emitters may include a single LED or an array of LEDs.

Some communication devices are known in the prior art.

For example, the prior art document WO2019005051 relates to a camera communication system using high speed camera sensors.

Further, the prior art document US2012/0230703 relates to a visible light communication receiver, a visible light communication system, and a visible light communication method.

The prior art document of Sayf ALBAYATI, published in the International Journal of Computer Science and Mobile Computing, Vol. 8 Issue 6, June-2019, pg. 51-56 relates to an overview of visible light communication systems.

The prior art document US2019/0386746 relates to a VLC Location data application in a retail setting.

The prior art document US2020/044886 relates to a Camera Based Commissioning.

However, the prior art documents have the following drawbacks.

They are not suitable for installation on a clothing equipment and for detection of workers in a factory.

Since the communication media is the light, the environment in which the visual light communications are operated may include light noise that interferes with the light messages and reduce the reliability of messaging. Light noise may appear from different reasons e.g. scattered light, multiple reflections, ambient light such as neon lights of factory, turn signals of vehicles, siren lamps of fork lift vehicles, sun light etc.

Further, optical filters are typically used to reduce the light noise but they limit the type of light source for which communication can be done. For example, if the environment in which visual light communication has occur contains blue lights, then prior art highly recommends to choose a light emission in a different colour band or filter out the blue components of light emitter, otherwise communication may not be reliable. An optical filter ensures that only a certain light wavelength can be reliably communicated.

Further, current VLC devices have been applied for operating a retail establishment for identifying the location of shop gondolas from a mobile VLC receiver. They have also been applied to create a floor plan to commission a lighting control system. Both systems relied on VLC communication devices which are typically subject to light noise. These systems require either the mobile VLC device to be close to the emitter (a few meters) or could be used only in a specific environment because they use optical filters as mentioned above.

Communication range is limited due to the line of sight requirement and due to the ambient noise, which becomes hard to separate from message data as the range increase.

It is sometimes important to understand the distance between emitter and receiver especially when emitter or receiver are moving (or both).

Despite that each emitter may cooperate with a GPS device to transmit its GPS coordinates (geolocalization), it is not guaranteed that the receiver can retrieve its own GPS coordinate with an accuracy high enough to compute accurately distance (few cm error, e.g. arm, hand or finger safety) between receiver to emitter. Further, when installed indoor, the GPS location may not be accurate.

Further, a camera or a 3D sensor may be able to compute a distance. However, such devices have low capacities, in particular during night, or low luminosity (e.g. twilight) or high luminosity (dazzle), or if the object is too thin to be detected.

Light interferences between visual light communication devices may also reduce the reliability of visual light communication. Message broadcasting is indeed limited due to the necessity to separate the sources of the different messages.

A need thus exists for clothing equipment which is not susceptible to the drawback mentioned above.

SUMMARY

According to an aspect of this disclosure, clothing equipment having a visual light communication emitter arranged to communicate a status of the clothing equipment, includes a light emitter arranged to emit flash light which is modulated at at least one target frequency in a dedicated non-visible spectrum, the light emitter including three fixed emitting portions distant from each other by predetermined distances, so as to authenticate the status of the clothing equipment.

According to another aspect of this disclosure, a method for monitoring movement in a factory, includes the steps consisting of authenticating a machine in the factory equipped with a machine visual light communication emitter, localizing said machine in the factory with machine visual light communication emitter, authenticating a worker in the factory equipped with a clothing equipment according to the first aspect, localizing said worker in the factory with the clothing equipment, computing an authenticated safety distance between the worker and the machine, and emitting a safety warning if the authenticated safety distance is below a predetermined threshold.

BRIEF DESCRIPTION OF THE DRAWINGS

The foregoing and additional features and characteristics of this disclosure will become more apparent from the following detailed description considered with the reference to the accompanying drawings, wherein:

FIG. 6 represents the clothing equipment according to the embodiment in the environment of the factory.

DETAILED DESCRIPTION

Figure 1:
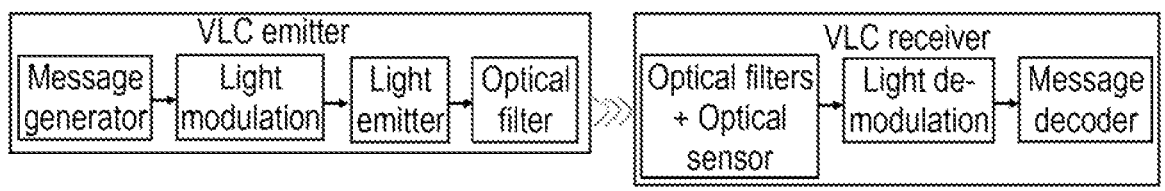
FIG. 1 represents a visual light communication emitter and receiver according to the prior art.

FIG. 1 represents a visual light communication emitter and receiver according to the prior art. In the prior art, the visual light communication (VLC) emitter includes a message generator, a light modulation module, a light emitter and an optical filter. The message generator is able to send information to the light modulation which send a signal to the light emitter to emit light at a given wavelength corresponding to a given color in the visible spectrum between 400 THz and 770 THz (i.e. 400 to 700 10^12 Hz). The optical filter changes the wavelength of the light emitter so that the emitted color is changed.

The visual light communication receiver according to the prior art comprises optical filters along with an optical sensor in order to detect the light emitted by the visual light communication emitter according to the prior art. The visual light communication receiver further comprises a light demodulation module and a message decoder, in order to transcript the message initially generated by the message generator of the visual light communication emitter.

Such visual light communication receiver is not practical to install on a clothing equipment, and does not allow to authenticate a worker wearing the clothing equipment with enough precision and accuracy.

Figure 2:
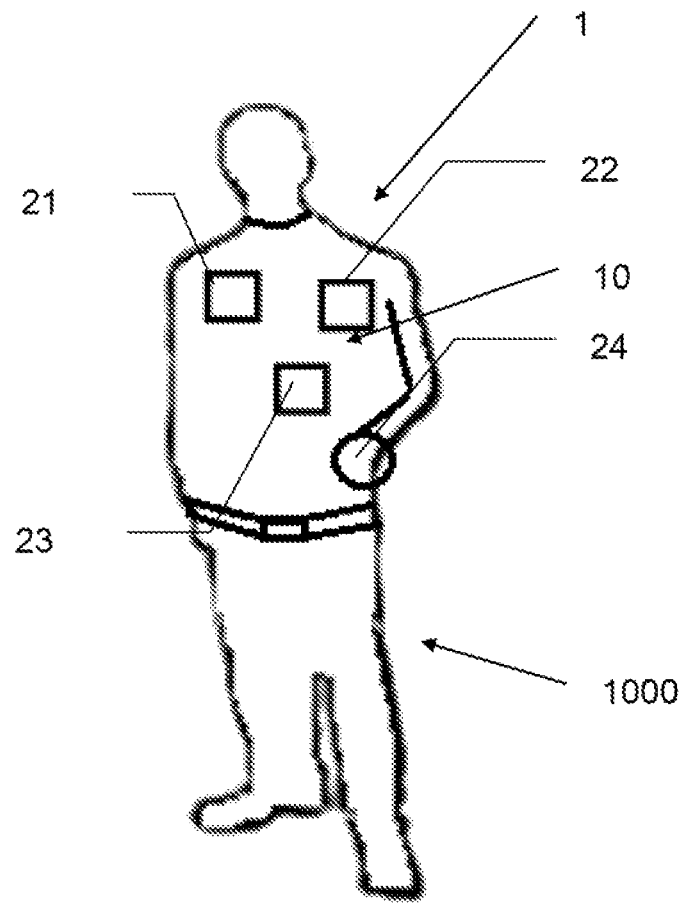
FIG. 2 represents a clothing equipment according to an embodiment.

FIG. 2 represents the clothing equipment 1 worn by a worker 1000. The clothing equipment 1 has a visual light communication emitter 10 arranged to communicate a status of the clothing equipment 1, and comprising:
- a light emitter arranged to emit flash light which is modulated at at least one target frequency in a dedicated non-visible spectrum,
- the light emitter comprising three fixed emitting portions 21, 22, 23 distant from each other by predetermined distances, so as to authenticate the status of the clothing equipment 1. The three emitting portions 21, 22, 24 are sewn on the clothing equipment. The clothing equipment may comprise a jacket onto which are sewn the three emitting portions 21, 22, 23.

The clothing equipment 1 further comprises a mobile emitting portion 24 sewn for example on a glove or at an end of jacket sleeve and is thereby arranged to be mobile compared to the three fixed emitting portions 21, 22, 23. The fixation between the emitting portions to the clothing equipment could be also with zip, press button, glue or any type of fixation.

The three fixed emitting portions 21, 22, 23 are arranged to communicate a unique identifier of the clothing equipment 1, such as a size of the clothing equipment 1 (e.g. Small, Medium, Large, Extra Large) or a proprietor reference of the clothing equipment 1. This could be also the current size of the worker 1000, preliminary registered.

Preferably, the target frequency is between 200 Hz and 1 MHz, preferably between 5 kHz and 500 kHz, more preferably between 50 kHz and 100 kHz.

Further, it has been observed that there no (or very few) natural events in said ranges in the nature due to natural phenomenon (natural light source). Thereby, the visual light communication and in particular the detection with a visual light communication receiver having a detector (in particular an event camera detector) is very accurate and does not suffer from noise.

That is, to avoid interference due to light noise, the light emitter flashes at a frequency not existing in typical condition of usage. It has been experimentally determined that during activities in factories, the events recorded by an event camera never exceed a frequency of 200 Hz. It means that there is no emitting light source (natural and/or artificial such as buildings, shops, traffic lights) encountered during working in factory that emits at a frequency between 200 Hz and 1 MHz (which is the upper limit of time resolution of event cameras). The event camera can sample event up to 1 000 000 events/s.

Therefore, it is preferred to set the visual light communication flashing frequency above 200 Hz and below 1 MHz. It is considered that the various sources of light noise are drastically reduced at this flashing/target frequency.

Still further, the mobile emitting portion 24 may emit a different information, such as a quality control identificatory, and may emit at a different target frequency than the three emitting portions. Said difference between target frequencies is preferably set a 0.3 kHz or 0.5 kHz. The difference may be preferably selected in the range of 0.01 kHz to 1 kHz, preferably 0.1 kHz to 0.5 kHz. The difference may also be selected in the range of 1 kHz to 100 kHz. This increase the reliability of the communication of the clothing equipment. Indeed, as mentioned above, there is no natural phenomenon in the selected range of flash light, and there is no natural phenomenon having said predetermined difference in said selected range of frequency.

Figure 3:
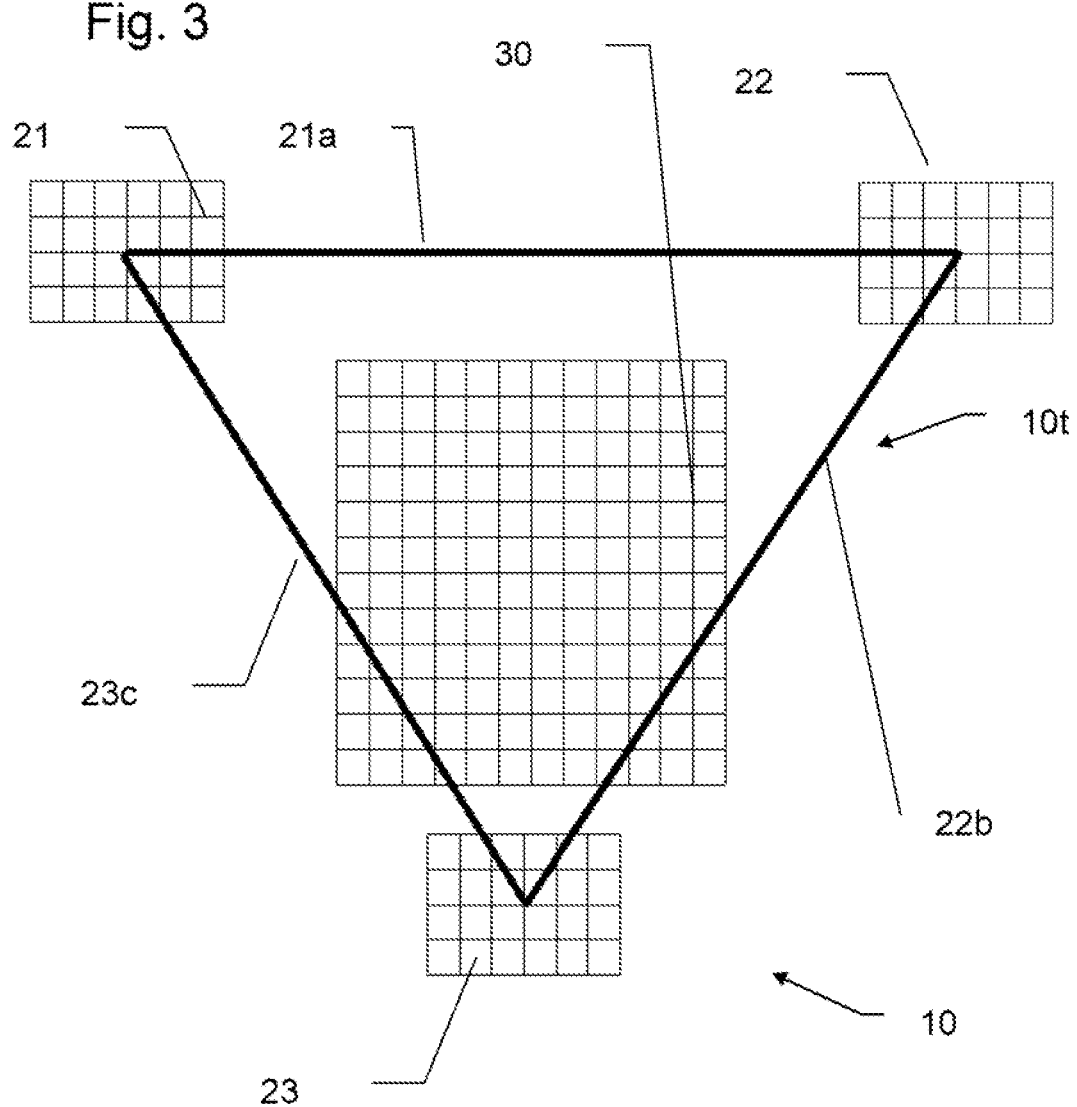
FIG. 3 represents a detailed view of a visual light communication emitter sewn on the clothing equipment according to the embodiment.

FIG. 3 represents a detailed view of the visual light communication emitter 10.

The visual light communication emitter 10 comprises three fixed emitting portions 21-23 having a set of LED group (light-emitting diode). The set of LED group comprises a first group of LEDs 21 having four arrays of six individual LED, a second group of LEDs 22 with the same number of individual LED and a third group of LEDs 23 with the same number of individual LED. Of course, the number of LEDs in each group is an example of the number of LED, and could be adapted to other size of visual light communication emitter 10. The three fixed emitting portions 21-23 emit at a given wavelength which is preferably in the visible spectrum (such as white color, red color, blue color, red color or yellow color or any combination thereof) and/or in the near infrared. Further, the light from the three emitting portions 21-23 is modulated so that emitter emits flash light at a target frequency which is in a dedicated non-visible spectrum. In other words, the light from the light emitter 21-23 is modulated at the dedicated target frequency, which is a successive state of ON state—OFF state—ON state—OFF state etc. (i.e., light emitter is blinking or flashing) so that the three emitting portions 21-23 emit flash light at the dedicated target frequency. The target frequency could be reformulated as the number of ON states during one second.

LEDs allow ultra-fast switching between ON-OFF lighting states (flashing) which in turn allows to encode messages.

In case of array or plurality of LEDs in a same group or in different groups, all LEDs may emit the same message (to ensure high reliability) or each LED may emit parts of the message to allow higher data transmission rate via parallel transmission. In particular, this could be very interesting if one of the emitters is hidden when the worker works on a machine (e.g. uncomfortable position).

The first group of LEDs 21 of the second light emitter 21-23 is placed for example in the top left corner, the second group of LEDs 22 of the second light emitter 21-23 is placed on the top right corner and the third group of LEDs 23 of the second light emitter 21-23 is placed in the middle bottom. In other words, the light emitter 21-23 comprises three emitting portions being the three groups of LEDs 21-23, each emitting portion being distant from each other by predetermined distance, so as to form a lamp triangle 10t having a predetermined dimension. The dimension of the lamp triangle 10t are the distance 21a between the first group of LEDs 21 and the first group of LEDs 22, the distance 22b between the second group of LEDs 22 and the third group of LEDs 23, and the distance 23c between the third group of LEDs 23 and the first group of LEDs 21. The lamp triangle 10t could be an equilateral triangle for which the distance between corners are the same, or any type of triangle. The predetermined dimensions are known by the receiving device or emitted by the emitter, so as to allow authentication.

It has to be noted that the human eye is not able to distinguish changes of light such as successive ON states—OFF states above the frequency of 100 Hz, due to retinal persistence (persistence of vision). It allows to comply with indoor/factory requirement, in particular in term of safety and safety of driving.

In another embodiment, the visual light communication emitter 10 further comprises another light emitter 30. In the similar manner as discussed above, the other light emitter 30 emits flash light at another target frequency which is in the non-visible spectrum.

The other target frequency is preferably selected in the range of 0.2 kHz to 1 MHz, more preferably 1 kHz to 0.9 MHz, and even more preferably 1 kHz to 500 kHz. The other target frequency is 5 or 6 kHz in a preferred example, in order to facilitate distinction with the other frequencies, and to increase the reliability of the communication as discussed above. There is no event due to a natural light source in the range selected for the other target frequency.

The other light emitter 30 is preferably placed at least partly inside the lamp triangle 10t, in order to facilitate localization of the lamp triangle 10t.

The group of LEDs of the light emitter 21-23 is preferably placed on each side of the lamp triangle 10t, so as to facilitate localization of the lamp triangle 10t.

In a preferred embodiment, the distance is computed according to the so-called Perspective-n-Point, so as to estimate the pose of a calibrated camera according to a set of n 3D points and their corresponding 2D projections in the image. The camera pose consists of six degrees-of-freedom: three rotation (roll, pitch, and yaw) and three translation. So-called Perspective-n-point is known and in particular for example applications with n=3 and n=2. Example of such is explained by the "P3P and P2P Problems with known camera and object vertical directions" published by Luigi D'Alfonso, Emanuele Garone, Pietro Muraca, Paolo Pugliese and gprix.it. In addition, such Perspective-n-point methodology are known from https://en.wikipedia.org/wiki/Perspective-n-Point and http://users.umiacs.umd.edu/~ramani/cmsc426/Lecture23_3Dpose.pdf.

The distance can be inferred using the 3 points method providing that camera internal parameters are known in advance.

As the three emitting portions 21, 22, 23 are sewn and thereby fixed onto the clothing equipment, the predetermined distances 21a, 22b, 23c remain sensibly constant.

Figure 4:
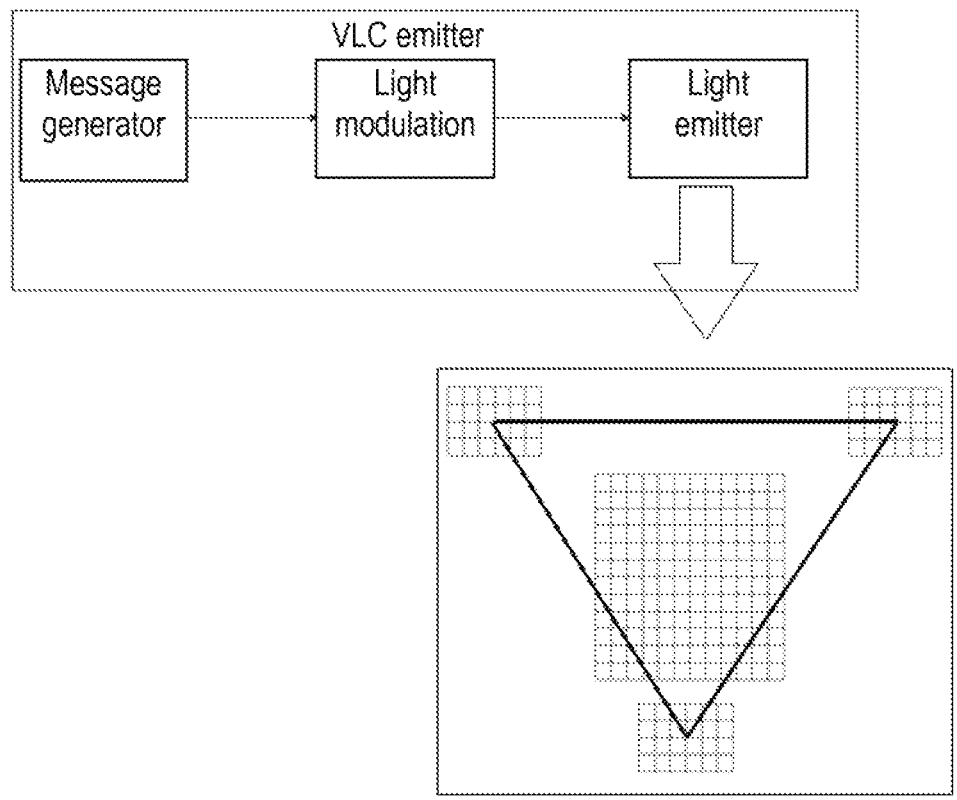
FIG. 4 represents an enlarged view of the visual light communication emitter sewn on the clothing equipment according to the embodiment having a message generator and a light modulation module.

FIG. 4 represents an enlarged view of visual light communication emitter sewn on the clothing equipment in a preferred embodiment, and having a message generator and a light modulation module.

The visual light communication emitter further comprises a message generator to generate a message, a light modulation module to modulate the flash light emitted by the light emitter, being the visual light communication emitter 10 illustrated in detailed view in FIG. 3.

Figure 5:
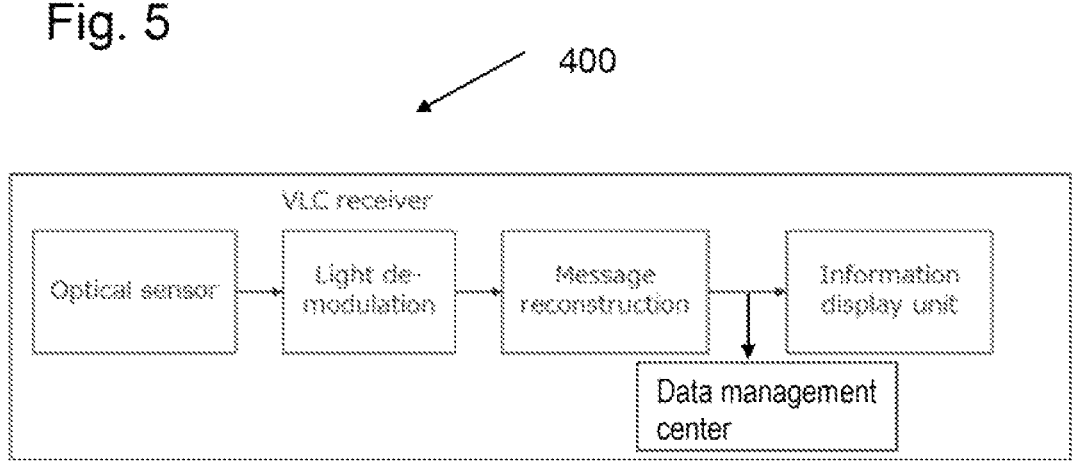
FIG. 5 represents a visual light communication receiver installed in a factory for implementing the method according to the embodiment.

FIG. 5 represents the visual light communication receiver in order to implement the method according to the second aspect.

The visual light communication receiver 400 comprises an optical sensor in order to detect light, a light de-modulation module in order to retrieve modulation of light, a message reconstruction in order to reconstruct a message and an information display unit in order to display information.

The optical sensor is preferably an event camera, which detects the changes on pixels of a detected image (e.g. count of transition detection).

Among the most suitable optical sensors are the cameras since they are able to sense light emission in a wide field of view allowing to sense messages coming from one or multiple VLC emitters. Neuromorphic cameras such as event cameras are particularly well suited for handling high speed visible light communication. This kind of sensor generates spikes (events) when it observes a change in the intensity for each pixel. Unlike frame in conventional cameras, this mechanism gives event cameras many advantages such as a high temporal resolution, which could achieve 1M frame/s, high dynamic range (>120 dB), high spatial resolution (1280×720), could be fitted with any optical lens allowing high directivity and most of all no redundancy in the data which is directly linked with low energy consumption of visual light communication signal decoding algorithms. Thus, event camera become a perfect fit for sensing light changes caused by high speed modulated LED light. This allows to treat signal as soon as it arrives (fast response) and to separate time series (high accuracy in signal recognition). It allows to process temporal spike signal. The fast response is very suitable for safety purpose.

The event camera is able to detect at least light in the visible light spectrum and in the near infrared spectrum, and to detect changes such as the target frequencies of the visual light communication emitter.

It is possible to proceed with the following steps.

Pixels are accumulated in order to sense an event (activated=positive versus deactivated=negative) over a time period greater than e.g. two times the period of the expected flashing frequency of the emitting light (the target frequency). For reliable communication, the time slice for accumulation should allow to accumulate preferably five to ten emitting periods.

For each accumulated pixel of the event camera, it is identified when a pixel is activated due to an appearing event (ON). It is also identified when the same pixel is de-activate by a disappearing event (OFF).

Since each event is timestamped, it is possible to compute the difference of time between event ON and OFF (or OFF to ON) of the same pixel (i.e. 1 flash). The inverse of this difference corresponds to the frequency of the change of state of the pixel.

Then, the number of times each frequency of flashing event appeared (histogram of frequencies) is computed. There should be a peak in the frequency corresponding to the different target frequencies. By identifying these peaks, it is possible to identify the emitting device by looking at a pre-stored map of allowed emitting devices and their related target frequencies.

Then, a localization on a 2D map (image) for each pixel of coordinate (x, y) is determined, the image area representing each target frequency. It allows to understand the direction of each of the emitting device. In this way, it is possible to reconstruct the image of the emitting areas.

For each detected emitting device, it is possible to search in the histogram of frequencies each pixel englobed near/inside the reconstructed device type emitting areas that emits at a given frequency. Then using visual light communication messaging methods, it is possible to decode the messages only emitted within a time frame of the flash of target frequency and/or only located in the messaging areas.

The message may comprise several information such as unique ID of emitter, speed of emitter, emitter, moving direction, and the length of segments of the lamp triangle 10*t* formed by the three emitting portions. This latter information is used to compute the distance between emitter and receiver. The remaining of the message is used during reconstruction below.

In the histogram of frequencies, it is possible to search the peaks corresponding to target frequency, and the predetermined difference between the target frequencies. It is used to localize on the 2D image where are located the lamp triangle 10*t*. Indeed, it is possible to know the (x, y) coordinate of each pixel which has been emitted at target frequency plus the predetermined difference.

Then, it is possible to localize onto the 2D images by using the above-mentioned length of the segments of the lamp triangles 10*t*. To compute this distance, it is possible to use the Perspective 3 points method.

Once the distance is known, it is possible to reconstruct the received message. This is the end of the message decoding procedure.

This message is transmitted to a display unit that will inform the owner of visual light communication receiving device of potential warning and suggest actions to be taken.

The receiver also comprises a data management center to register in particular authentication data.

FIG. 6 represents a factory seen from the top view, equipped with machines 101, 102, 103, each being equipped with three emitting portions 101*a*, 101*b*, 101*c*, 102*a*, 102*b*, 102*c*, 103*a*, 103*b*, 103*c* respectively. The three emitting portions are placed so as to form triangles.

The machines 101, 102, 103 have moving parts or can be fully mobile. The machines are separated by distances to walls or to each other. For instance, the first machine 101 is separated by a distance 200 with the wall and a distance 210 with the second machine 102. The second machine 102 is separated by a distance 220 with the third machine. The third machine 103 is separated by a distance 230 with the next wall.

The factory is equipped with a door 500. The worker 1000 is equipped with the clothing equipment 1 and may walk on a pathway between positions 310, 320 and 330 in the factories. The distance 340 separates the worker 1000 and the second machine 102. The worker 1000 may receive information from the visual light emitters 110, 111, 112.

The factory is equipped with the visual light communication receiver 400 having the event camera, and is also equipped with an alarm 410 in order to emit any kind of safety warnings (visual, sound, vibration, or any combination thereof). It is also possible to have emergency stop of the machines 101, 102, 103 based on the comparison between discussed distances and thresholds.

When the machines 101, 102, 103 are moving or when the worker 1000 is moving, the event camera can detect the position of each thanks to their respective three emitting portions. It is possible to compute the distance separating the machines 101, 102, 103 and the workers (or the distance separating the machines 101, 102, 103 to avoid crush or any pinch of worker) and thereby alert with the alarm 410 if the distances are below predetermined thresholds. For example, the threshold related to the second machine 102 with the worker 1000 can be different than the threshold related to the first machine 101 and the wall. Thereby, it allows to have a more secure factory.

Further, it is possible to predict a position or a movement of the machines 101, 102, 103, either by observing their current behaviour or by receiving their target position.

Each machine 101, 102, 103 may emit flash light at a given target frequency, different from the other machines 101, 102, 103 and different from the worker 1000. For example, drilling machine may emit at 1 kHz to 1.5 k Hz, emergency lamp at 2 k Hz to 2.5 k Hz, milling machine at 3 k Hz to 3.5 k Hz, and similar may emit at different frequencies in said range given for example.

In addition, it is possible to predict a position or a movement of the worker 1000, for example in a given range of time in the future (e.g. less than 1 second, 1 to 3 seconds, 3 to 10 seconds, or more than 10 seconds), based on the previous position or previous trajectory of the worker 1000 and/or based on the authentication of the worker 1000. Further, based on the same trajectory, it is possible to consider that an authorized worker may go to a given machine 101, 102, 103, while a non-authorized worker may not go to the given machine 101, 102, 103, and to manage the alarm accordingly. It could be to illuminate the area around the given machine 101, 102, 103 for the authorized worker, but not for the non-authorized worker, or vice-versa.

The worker 1000 may be in such situation that he will go closer to another worker, and it is necessary to predict his new trajectory to avoid collision with the other worker. Such new trajectory may be more dangerous because the worker 1000 will be closer to the machine 101, 102, 103 and will not respect the safety distance (an alarm may occur in such situation). It is also possible to send an instruction to the machine 101, 102, 103 to stop the machine 101, 102, 103 according to the new trajectory, and/or to illuminate (or inform about) a safety path for the worker so that he is invited to stay in a safe area.

The prediction of the trajectory and positions may occur for both the worker 1000 and the machine 101, 102, 103. For the machine 101, 102, 103, it could be the prediction of a part of the machine such as a robotized arm, based on the visualized trajectory (in particular if the robotized arm is equipped with the visual light emitter) or based on the movement that the robotized arm must perform. If, according to said predictions, there is a risk of overlap between the worker 1000 and the machine 101, 102, 103, an alarm is emitted and the safety area corrected accordingly.

It is also possible to create a map of safe areas considering the current distances between the machines 101, 102, 103 and the worker 1000, and to show this map on the ground of the factory (e.g. with green light or red light on the floor).

When the machines 101, 102, 103 moves, it may be possible to generate a new floor map and to verify it working safety rules are satisfied. The mapping may be done before the worker 1000 enters in the area, or on live, when there are workers 1000 in the factory.

It is possible to monitor the position of the worker 1000 and to register that the worker 1000 has controlled a given machine 101, 102, 103 by detecting a gesture of the worker 1000 equipped with the mobile emitting portion 24 discussed above. Said machine 101, 102, 103 can be considered as controlled in term of quality control and the selection of the machine under control can be identified as the closest machine 101, 102, 103 from the worker 1000, according to the time spent by the worker 1000 on the machine 101, 102, 103 or the worker 1000 move to a dedicated check point for a dedicated machine 101, 102, 103.

For example, when there is no worker 1000 before, the map is created and a message confirming that the area is safe is emitted and this activate a green light meaning that this is safe to work in the area. If this is not safe, a message confirming that the area is not safe is emitted, and a red light meaning that it is unsafe to work in the area is illuminate, along with an alarm.

It may be possible to register the safety distance in the data management center to build in real-time the map and analyse the safety distance, while communicating green or red lights.

In a preferred embodiment, machines 101, 102, 103 may be allowed to move only within a predetermined map or a reconstructed map.

Some workers 1000 may be allowed to move machines 101, 102, 103 when they are movable.

It is possible to place other receivers such as event cameras, for example in other place in the factory (wall or roof) and/or directly installed on the machines 101, 102, 103. This allows to have a network of receiver in order to increase the safety and the accuracy.

According to the embodiment, the clothing equipment that allows communication with high reliability, high capacity and which allow to increase the safety while being simpler is achievable.

According to the embodiment, closing equipment (1) having a visual light communication emitter (10) arranged to communicate a status of the clothing equipment (1), includes a light emitter arranged to emit flash light which is modulated at at least one target frequency in a dedicated non-visible spectrum, the light emitter including three fixed emitting portions (21, 22, 23) distant from each other by predetermined distances (21a, 22b 23c), so as to authenticate the status of the clothing equipment (1).

This allows to communicate information related to the clothing equipment so as to authenticate the clothing equipment, and in fine the person wearing the clothing equipment. This also allows to compute distance between the clothing equipment and a receiver, such as an event camera.

For example, the distance information can be used to control that an operator of a machining device in a factory is manipulating the machining device by respecting the safety distance. It can also be used to create a map of machining devices and control that the safety distance between devices is respected. It can also be used to ensure that machine inspector is regularly going close to the machine to check their safety conditions.

The clothing equipment according to the embodiment allows to transfer information with very high data rate ~10 to 30 Mbits/s and up to 100 Mbits/s in particular for short range. It allows also to have high data rate (~1 Mbits/s) for long range, even in presence of noise in the area. Further, such high bandwidth allows very low latency communication which is suitable for related safety critical applications such as machine inspection, in particular machining devices which could be dangerous. The visual light communications are not affected by electromagnetic noise which is not the case of radio frequency communication. It allows communication when radio frequency communication is not available, or not allowed (e.g. when precise measurement with sensible sensor are done nearby in the factory). The visual light communication is not causing arm to human health which is not the case for radio frequency communication. Further, it is less subject to data transmission security (hacking) issues because light transmission is very fast (difficult to intercept) and can only be intercepted if light emitter is in direct line of sight which is not the case for radio frequency communication. Still further, the clothing equipment according to the embodiment could be used for identification purposes and authentication. It is thereby possible to acknowledge that the signal comes from the worker equipped with such clothing equipment and that such worker is an authorized person.

According to the embodiment, the three fixed emitting portions (21, 22, 23) are fixed onto the clothing equipment (1) so that the predetermined distances (21a, 22b, 23c) remain sensibly constant. The visual light communication emitter (10) further includes a mobile emitting portion (24) arranged to be mobile compared to the three fixed emitting portions (21, 22, 23).

It allows to monitor accurately what is the position or the movement of the mobile emitting portion, in order to authenticate a message of the worker wearing the clothing equipment. For example, it could be a sign or a gesture from the worker to confirm that the machine under inspection is in a controlled state or good state, and that the inspection has been done by an authenticated worker wearing the clothing equipment. Other information can be transmitted by the gesture, such as any instruction of wear part to change on said machine, or any defect of a piece machined by the machining machine. Further, it is also to secure the information in cooperation with the position of the three fixed emitting portions, so that a fixed reference is positioned, such that noise or undue message are reduced and such that the gesture is more accurately detected with a fixed reference. For example, gesture being a round means that the machine is in good state, or gesture as a cross means the machine is not good or unsafe.

According to the embodiment, the three fixed emitting portions (21, 22, 23) are arranged to communicate a unique identifier of the clothing equipment (1), such as a size of the clothing equipment (1) or a proprietor reference of the clothing equipment (1).

It allows to have a unique identifier of the clothing equipment to ensure about the identity of the person wearing the clothing equipment. Further, it allows to adapt safety proceedings according to the size of the clothing equipment, in order to increase the acceptable safety distance between the worker and the machine, if the clothing equipment if for a tall person (e.g. 1.95 m) having corresponding long arms, or the decrease the acceptable safety distance if the person is not a tall person (e.g. 1.68 m).

The mobile emitting portion (24) is arranged to communicate a distinct information, distinct from the unique identifier of the clothing equipment (1).

The three fixed emitting portions (21, 22, 23) emit flash light which is modulated a first target frequency. The mobile emitting portion (24) emits flash light which is modulated a second target frequency.

It allows to ensure that the relevant information communicated by the mobile emitting portion is well recognized and acknowledged by the receiver, such as the event camera. Further, it allows to clearly distinguish between the moving portion to communicate gesture and fixed portion to communicate position or identification of the clothing equipment, so that the communication is quicker and safer.

The at least one target frequency is between 200 Hz and 1 MHz, preferably between 5 kHz and 500 kHz, more preferably between 50 kHz and 100 kHz.

It allows to have a clear communication between the clothing equipment and the receiver, as it has been observed that there is no or few light events above 200 Hz and below 1 MHz in indoor facilities such as factories. Further, it allows to switch and select the good target frequency range according to the environmental condition, in particular if one range, which has been preselected is crowdy or saturated, or to operate in downgraded mode.

The clothing equipment further includes a jacket onto which the three fixed emitting portions (21, 22, 23) are fixed.

The clothing equipment further includes at least one glove onto which the mobile emitting portion (24) is fixed.

It allows to have a jacket communicating with the three fixed emitting portions, with predetermined distance which are relatively stable compared to each other, considering a given mechanical strength of the tissue of the jacket. The three fixed emitting portions could be sewn on the jacket, for example at the chest level, but preferably not at the level of articulation such as the shoulder. In comparison, the distance between the mobile emitting portion and the fixed portion is variable, for example when the mobile emitting portion is positioned at the end of the arm, near the wrist. Further, the mobile emitting portion can be placed on at least one glove so that it is clearly positioned on a mobile portion, at the level of the wrist or at the level of fingers.

According to the embodiment, a method for monitoring movement in a factory, includes the steps consisting of authenticating a machine (101, 102, 103) in the factory equipped with a machine visual light communication emitter (101a-c, 102a-c, 103a-c), localizing the machine (101, 102, 103) in the factory with machine visual light communication emitter (101a-c, 102a-c, 103a-c), authenticating a worker (1000) in the factory equipped with clothing equipment (1) having a visual light communication emitter (10) arranged to communicate a status of the clothing equipment (1), the closing equipment including a light emitter arranged to emit flash light which is modulated at at least one target frequency in a dedicated non-visible spectrum, the light emitter including three fixed emitting portions (21, 22, 23) distant from each other by predetermined distances (21a, 22b 23c), so as to authenticate the status of the clothing equipment (1), localizing the worker (1000) in the factory with the clothing equipment (1), computing an authenticated safety distance between the worker (1000) and the machine (101, 102, 103), and emitting a safety warning if the authenticated safety distance is below a predetermined threshold.

This allows to authenticate and emit a safety warning according to an authenticated safety distance, which may depend on the person in the factory. For example, some workers could be authorized person having a short authenticated safety distance, while other workers could have a longer authenticated safety distance, due to less experience in that kind of works or due to other membership.

The method further includes the steps consisting of predicting a future position of a moving part of the machine (101, 102, 103), computing a first predicted authenticated safety distance between the worker (1000) and the moving part of the machine (101, 102, 103) based on the future position of the moving part of the machine (101, 102, 103), and emitting a first predicted safety warning if the first predicted authenticated safety distance is below a first predicted predetermined threshold.

The method further includes the steps consisting of predicting a future position of the worker (1000), computing a second predicted authenticated safety distance between the future position of the worker (1000) and the machine (101, 102, 103) based on the future position of the worker (1000), and emitting a second predicted safety warning if the second predicted authenticated safety distance is below a second predicted predetermined threshold.

It allows to predict and alert of any possible danger.

The method further includes the steps consisting of localizing a body part of the worker (1000) equipped with the clothing equipment, computing an additional authenticated safety distance between the body part of the worker (1000) and the machine, and emitting an additional safety warning if the additional authenticated safety distance is below an additional predetermined threshold.

It allows to increase the safety for the workers, in particular for part of the body, such as hand or arm.

The method further includes the steps consisting of detecting a movement of the body part of the worker (1000), comparing the movement of the body part of the worker (1000) with a predetermined gesture, if the movement of the body part of the worker (1000) and the predetermined gesture match, registering a quality control status of the machine (101, 102, 103) as controlled.

It allows to detect and register any information about the quality control status, in order to ease the control. In particular, the distance between the worker and the machine is computed so that the machine under control is identified, and the worker makes the predetermined gesture to communicate that e.g. the machine has been controller, or that e.g. the machine need to be counterchecked or need further maintenance, with a specific wear part.

The method further includes the steps consisting of mapping a safe working area in the factory based on the localization of at least one machine (101, 102, 103) in the factory.

It allows to map and indicate to workers safe areas. It is possible to inform the worker with light on the ground for example, with the indication if areas are safe and/or subject to movement of machines.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. Clothing equipment having a visual light communication emitter arranged to communicate a status of the clothing equipment, comprising:

a light emitter arranged to emit flash light which is modulated at at least one target frequency in a dedicated non-visible spectrum, the light emitter comprising three fixed emitting portions distant from each other by predetermined distances, so as to authenticate the status of the clothing equipment, wherein the three fixed emitting portions are arranged to communicate a unique identifier of the clothing equipment to authenticate the clothing equipment to perform a specific function.

2. Clothing equipment according to claim 1, wherein the unique identifier identifies a size of the clothing equipment or a proprietor reference of the clothing equipment.

3. Clothing equipment according to claim 1, wherein the at least one target frequency is between 200 Hz and 1 MHz, preferably between 5 kHz and 500 kHz, more preferably between 50 kHz and 100 kHz.

4. Clothing equipment according to claim 1, further comprising a jacket onto which the three fixed emitting portions are fixed.

5. Clothing equipment having a visual light communication emitter arranged to communicate a status of the clothing equipment, comprising:

a light emitter arranged to emit flash light which is modulated at at least one target frequency in a dedicated non-visible spectrum, the light emitter comprising three fixed emitting portions distant from each other by predetermined distances, so as to authenticate the status of the clothing equipment, wherein the three fixed emitting portions are fixed onto the clothing equipment so that the predetermined distances remain sensibly constant, and wherein the visual light communication emitter further comprises a mobile emitting portion arranged to be mobile compared to the three fixed emitting portions.

6. Clothing equipment according to claim 5, wherein the mobile emitting portion is arranged to communicate a distinct information, distinct from the unique identifier of the clothing equipment.

7. Clothing equipment according to claim 5, wherein the three fixed emitting portions emit flash light which is modulated a first target frequency, and wherein the mobile emitting portion emits flash light which is modulated a second target frequency.

8. Clothing equipment according to claim 5, further comprising at least one glove onto which the mobile emitting portion is fixed.

9. Method for monitoring movement in a factory, comprising the steps consisting of:

authenticating a machine in the factory equipped with a machine visual light communication emitter, localizing said machine in the factory with machine visual light communication emitter, authenticating a worker in the factory equipped with a clothing equipment having a visual light communication emitter arranged to communicate a status of the clothing equipment, the clothing equipment comprising:

a light emitter arranged to emit flash light which is modulated at at least one target frequency in a dedicated non-visible spectrum, the light emitter comprising three fixed emitting portions distant from each other by predetermined distances, so as to authenticate the status of the clothing equipment, localizing said worker in the factory with the clothing equipment, computing an authenticated safety distance between the worker and the machine, and emitting a safety warning if the authenticated safety distance is below a predetermined threshold.

10. Method for monitoring movement in a factory according to claim 9, further comprising the steps consisting of:

predicting a future position of a moving part of the machine, computing a first predicted authenticated safety distance between the worker and the moving part of the machine based on the future position of the moving part of the machine, and emitting a first predicted safety warning if the first predicted authenticated safety distance is below a first predicted predetermined threshold.

11. Method for monitoring movement in a factory according to claim 9, further comprising the steps consisting of:

predicting a future position of the worker, computing a second predicted authenticated safety distance between the future position of the worker and the machine based on the future position of the worker, and emitting a second predicted safety warning if the second predicted authenticated safety distance is below a second predicted predetermined threshold.

12. Method for monitoring movement in a factory according to claim 9, further comprising the steps consisting of:

localizing a body part of the worker equipped with the clothing equipment, computing an additional authenticated safety distance between the body part of the worker and the machine, and emitting an additional safety warning if the additional authenticated safety distance is below an additional predetermined threshold.

13. Method for monitoring movement in a factory according to claim 12, further comprising the steps consisting of:

detecting a movement of the body part of the worker, comparing the movement of the body part of the worker with a predetermined gesture, and if the movement of the body part of the worker (1000) and the predetermined gesture match, registering a quality control status of the machine as controlled.

14. Method for monitoring movement in a factory according to claim 9, further comprising the steps consisting of:

mapping a safe working area in the factory based on the localization of at least one machine in the factory.

* * * * *